Patented July 28, 1942

2,291,080

UNITED STATES PATENT OFFICE 2,291,080

METHOD OF PRODUCING PAPER HAVING HIGH WET STRENGTH AND PRODUCT THEREOF

Raymond P. Hofferbert, Stamford, Conn., assignor to American Cyanamid Company, New York, N. Y., a corporation of Maine No Drawing. Application February 6, 1940, Serial No. 317,527

5 Claims. (Cl. 117—155)

This invention relates to the production of paper having a high wet strength and improved chemical resistance.

An object of this invention is to produce a paper having a high wet strength. Another object of this invention is to provide a paper having a high wet strength and also good chemical resistance. Still another object of this invention is the production of paper having a high wet strength and sufficient flexibility to be useful for the ordinary purposes to which paper is applied.

These and other objects are attained by treating paper with a syrup containing an aminotriazine-formaldehyde condensation product.

The following examples in which the proportions are in parts by weight are given by way of illustration and not in limitation.

Example 1

|  | Parts |
|---|---|
| Melamine | 78 |
| A 50% solution of isopropanol in water | 53 |
| Formalin (37% formaldehyde in water) | 100 |
| A 10% solution of triethanolamine in water | 2.2 |

These substances are mixed and reacted at about 55–60° C. for 1–2 hours. During the reaction the pH is preferably maintained at about 7.0. The temperature may then be raised to about 70° C. for 20 minutes and then to about 75° C. for 20–30 minutes or until a clear syrup has been formed. This syrup is water-soluble and may be cooled to room temperature.

About 16 parts of the syrup prepared above are mixed with 184 parts of water and 11 parts of an accelerator solution containing about 1.75% of a mixture consisting of 4 parts of hexamethylene tetramine and 30 parts of diammonium sulphate. This composition is applied to a paper sheet in any convenient manner as, for example, by the use of rollers, one of which dips into the treating solution, by spraying, etc. The treated paper is preferably passed through a set of squeeze rolls to remove excess treating solution and to effect good impregnation of the paper. The resin content of the paper is thus adjusted to between 0.5% and 5%. The paper is then dried in an oven or other suitable apparatus at about 100° C., about 10 minutes being required for this operation. The dried impregnated paper is then cured at about 150° C. for approximately 3 minutes. The resulting treated paper has very high wet strength and good chemical resistance, therefore rendering it suitable for various uses wherein these properties are particularly desirable.

Optionally the treated paper may be dried and cured simultaneously but it has been found that somewhat superior results are obtained if the paper be dried at around 100° C. and then the curing of the resin effected at about 135–150° C.

Example 2

|  | Parts |
|---|---|
| Formoguanamine | 69 |
| A 50% solution of isopropanol in water | 50 |
| Formalin (37% formaldehyde in water) | 100 |
| A 10% solution of triethanolamine in water | 2.2 |

These substances are mixed together and heated at about 55–60° C. for about 1–2 hours. The pH during the reaction is preferably maintained at about 7.0. The temperature may then be raised to 70–75° C. for from ½ to about 1 hour, or until a clear syrup is obtained. The resulting syrup which is water-soluble may then be cooled to room temperature.

This syrup is applied to paper in the same general manner as described in Example 1, thereby producing a paper having a very high wet strength. Furthermore, the paper is quite resistant to chemical action and it is suitable for many purposes where such properties are required.

To obtain optimum properties only a small proportion of resin based on the weight of the paper should be applied, i. e. from about 0.5% to 5%. Larger proportions of resin render the paper unsuitable for most purposes.

Other aminotriazine-aldehyde condensation products may be substituted for part or all of the melamine-formaldehyde condensation product used in the above example. Among these are resins produced by condensing an aldehyde, e. g. formaldehyde and its polymers, acetaldehyde, propionaldehyde, butyraldehyde, hexaldehyde, heptaldehyde, crotonaldehyde, allyl aldehyde, benzaldehyde, cinnamyl aldehyde, furfural, etc., with one or more of the aminotriazines, e. g. melamine and its derivatives such as 2,4,6-triethyl- and triphenyl-triamino-1,3,5-triazines, 2,4,6-trihydrazino-1,3,5-triazine and the corresponding condensed triazines such as melam and melem, as well as triazines containing one or two amino groups such as ammeline, ammelide, 2-amino-1,3,5-triazine and their substitution products, as well as nuclear substituted aminotriazines such as 2-chloro-4,6-diamino-1,3,5-triazine, 2-phenyl-4-amino-6-hydroxyl-1,3,5-triazine and 6-methyl-2,4-diamino-1,3,5-triazine. Obviously commercial mixtures of the various triazines or mixtures thereof of other amino compounds may be used if desirable. One example of such commercial mixtures is the product obtained by heating dicyandiamide sufficiently to obtain a significant amount of melamine together with other reactive amino bodies. Furthermore, other amino materials may be used in admixture with the triazines, e. g. urea, thiourea, dicyandiamide, etc. In some instances it is also desirable to react other substances with formaldehyde or other aldehydes in conjunction with the aminotriazine, e. g. phenol, aniline, phenylene diamine, quinoline, etc. The condensation products may be produced by any suitable process and with any desired combining ratio of aldehyde to aminotriazine from 1:1 up to 6:1 or even higher. Furthermore the condensation products may be alkylated if desired with any suitable alcohol such as ethanol, propanol, butanol, amyl alcohol, cyclohexanol, benzyl alcohol, etc.

While resins produced by condensing formaldehyde or other aldehydes with aminotriazines or condensed aminotriazines give excellent results, it may be desirable to incorporate therewith other resins such as urea-formaldehyde resins, dicyandiamide-formaldehyde resins, thiourea-formaldehyde resins, mixed urea-thiourea-formaldehyde resins, phenol-formaldehyde resins, alkyd resins, etc. These resins may be made separately and then mixed with the aminotriazine resin or in some instances they may be made by reacting all of the materials simultaneously as indicated in the preceding paragraph. Mixed resins suitable for use according to this invention are those containing a substantial proportion of aminotriazine, e. g. at least about 20% of the total material capable of reacting with formaldehyde in order to obtain superior characteristics which distinguish the products of this invention from those previously used.

Other materials may be mixed with or emulsified with the aminotriazine-aldehyde condensation product in order to desirably modify the properties which are obtained with the condensation products alone. Examples of these are casein, rosin, albumen, gum tragacanth, alkyd resins, etc.

In order to obtain good impregnation of the paper with the resinous syrups containing aminotriazine-aldehyde condensation products suitable wetting agents may be incorporated such as sodium lauryl sulphate, sodium lauryl sulphonate, the soluble salts of the esters of sulphosuccinic acid (e. g. the sodium salt of the dioctyl ester of sulphosuccinic acid), the sodium salt of alkylated naphthylene sulphonic acids, ordinary soaps, etc. Suitable surface tension modifiers may also be incorporated in the impregnating solutions, e. g. ethanol, acetone, etc. Obviously any other known catalysts may be used in place of the one described in the above example or the aminotriazine-aldehyde condensation product may be polymerized without the use of any catalyst. Examples of other suitable catalysts are: phosphoric acid, phthalic acid, the ammonium or amine salts of such acids, alum, ammonium chloride, etc. These may either be added to the resin treating solution or they may be applied to the paper after impregnation with the resinous syrup.

This application covers processes for producing paper having a high wet strength and products thereof wherein aminotriazine-aldehyde resins are employed. My co-pending application Serial No. 317,526, filed February 6, 1940, entitled "Paper having high wet strength and processes of producing the same," is a division of this application covering the use of melamine-formaldehyde resins in the same process.

Paper treated in accordance with my invention has a wide variety of uses, as filter paper for commercial processes, as packaging material for corrosive materials, as stock paper for laminating, as wrapping material for damp articles such as meat, etc. Furthermore, paper treated with aminotriazine-formaldehyde condensation products as described herein is also suitable for paper towels, toilet tissues, etc.

Obviously many modifications and variations in the process as set forth above may be made without departing from the spirit and scope of the invention as defined in the appended claims.

I claim:

1. A process of increasing the wet strength of paper which comprises treating paper with an aqueous solution of an aminotriazine-aldehyde condensation product and adjusting the content of said condensation product so that the proportion thereof is about 0.5–5% of the weight of the paper (dry basis) and polymerizing said condensation product.

2. A process of increasing the wet strength of paper which comprises treating paper with an aqueous solution of an aminotriazine-formaldehyde condensation product, adjusting the content of said condensation product so that the proportion thereof is about 0.5–5% of the weight of the paper (dry basis) and polymerizing said condensation product.

3. A process of increasing the wet strength of paper which comprises treating paper with an aqueous solution of a formoguanamine-formaldehyde condensation product, adjusting the content of said condensation product so that the proportion thereof is about 0.5–5% of the weight of the paper (dry basis) and polymerizing said condensation product.

4. Paper impregnated with about 0.5–5% of the weight of the paper (dry basis) of an aminotriazine-aldehyde resin, said paper having a higher wet strength than the same paper which has not been impregnated with resin.

5. Paper impregnated with about 0.5–5% of the wet strength of the paper (dry basis) of a formoguanamine-formaldehyde resin, said paper having a higher wet strength than the same paper which has not been impregnated with resin.

RAYMOND P. HOFFERBERT.